(12) United States Patent
Hertz et al.

(10) Patent No.: US 12,464,216 B2
(45) Date of Patent: Nov. 4, 2025

(54) HAPTIC CAMERA CONTROL AND OBJECT ORIENTATION

(71) Applicants: Liron Hertz, Givataim (IL); Roi Ginat, Los Gatos, CA (US); Nimrod Sandlerman, Ramat-Gan (IL); ENDLESS TECHNOLOGIES LTD., Ramat Gan (IL)

(72) Inventors: Liron Hertz, Givataim (IL); Roi Ginat, Los Gatos, CA (US); Nimrod Sandlerman, Ramat-Gan (IL)

(73) Assignee: ENDLESS TECHNOLOGIES LTD., Ramat Gan (IL)

( * ) Notice: Subject to any disclaimer, the term of this patent is extended or adjusted under 35 U.S.C. 154(b) by 0 days.

(21) Appl. No.: 18/275,368

(22) PCT Filed: Feb. 7, 2022

(86) PCT No.: PCT/US2022/015457
§ 371 (c)(1),
(2) Date: Aug. 1, 2023

(87) PCT Pub. No.: WO2022/170173
PCT Pub. Date: Aug. 11, 2022

(65) Prior Publication Data
US 2024/0121500 A1 Apr. 11, 2024

Related U.S. Application Data

(60) Provisional application No. 63/146,773, filed on Feb. 8, 2021.

(51) Int. Cl.
*H04N 23/69* (2023.01)
*G06T 7/70* (2017.01)
(Continued)

(52) U.S. Cl.
CPC ............. *H04N 23/611* (2023.01); *G06T 7/70* (2017.01); *H04N 23/50* (2023.01); *H04N 23/62* (2023.01);
(Continued)

(58) Field of Classification Search
CPC ...... H04N 23/611; H04N 23/69; H04N 23/50; H04N 23/90; H04N 23/62; G06T 7/70
(Continued)

(56) References Cited

U.S. PATENT DOCUMENTS

| | | |
|---|---|---|
| 2013/0293488 A1 | 11/2013 | Na et al. |
| 2015/0149956 A1 | 5/2015 | Kempinski et al. |
| 2020/0296521 A1 | 9/2020 | Wexler et al. |

OTHER PUBLICATIONS

International Search Report for PCT/US2022/015457 dated May 3, 2022 [PCT/ISA/210].

*Primary Examiner* — Nguyen T Truong
(74) *Attorney, Agent, or Firm* — Sughrue Mion, PLLC (57) ABSTRACT

An imaging device including a plurality of image-sensors including at least a first image sensor and a second image sensor mounted in substantially opposing directions, and a controller coupled to the sensors. The controller captures the first image content from the first image sensor, and the second image content from the second image sensor, substantially simultaneously, then analyzes the first image content to detect a user of the imaging device, and to determine a direction in which the user is looking, The controller then captures the second image from the second image sensor, and selects a zoom part of the second image. The zoom part located in the user looking direction. Alternatively, the controller selects a second image sensor from the plurality of image sensors, where the selected second image sensor is directed in the user looking direction.

22 Claims, 8 Drawing Sheets

(51) Int. Cl.
    *H04N 23/50*    (2023.01)
    *H04N 23/611*   (2023.01)
    *H04N 23/62*    (2023.01)
    *H04N 23/90*    (2023.01)
(52) U.S. Cl.
    CPC ............. *H04N 23/69* (2023.01); *H04N 23/90*
           (2023.01); *G06T 2207/30196* (2013.01)
(58) Field of Classification Search
    USPC .......................................................... 348/39
    See application file for complete search history.

HAPTIC CAMERA CONTROL AND OBJECT ORIENTATION

CROSS REFERENCE TO RELATED APPLICATIONS

This application is a National Stage of International Application No. PCT/US2022/015457 filed Feb. 7, 2022, claiming priority based on U.S. Patent Application No. 63/146,773 filed Feb. 8, 2021.

FIELD

The method and apparatus disclosed herein are related to the fields of imaging and hand-held devices, and more particularly but not exclusively, to wearable computing devices, and more particularly but not exclusively, to wearable imaging devices.

BACKGROUND

Camera miniaturization, followed by price decrease, and augmented by proliferating and inexpensive communication services, introduced imaging to daily life. Instant image capturing and communication is easily available anywhere, anytime. However, pointing a camera at a person may be regarded as an offence. There is thus a widely recognized need for, and it would be highly advantageous to have, a system and method for selecting a captured image without having to point the camera at an object.

SUMMARY OF THE INVENTION

According to one exemplary embodiment, there is provided a device, a method, and a software program enabling a user to orient a camera at a region of interest, capture an image of the region of interest, and concentrate the imaging on the region of interest, simply by looking at the region of interest.

According to another exemplary embodiment an imaging device is provided, imaging device including a plurality of image-sensing devices comprising at least a first image-sensing device and a second image-sensing device mounted to capture a second image in substantially opposing direction to a first image captured by the first image-sensing device, and a controller communicatively coupled to the at least first image-sensing device and second image-sensing device.

According to still another exemplary embodiment the controller is configured to capture the first image content from the first image-sensing device, and the second image content from the second image-sensing device, substantially simultaneously, to analyze the first image content to detect a user of the imaging device, and to determine a direction in which the user is looking, to form user looking direction, to capture the second image from the second image-sensing device, and to zoom the second image in the user looking direction by selecting a part of the second image concentrated in the user looking direction.

According to still another exemplary embodiment the controller is configured to zoom the second image by selecting a second image-sensing device from the plurality of image sensing devices, where the selected second image-sensing device is directed in the user looking direction, and wherein the at least two image-sensing devices comprise at least three image-sensing mounted in respective at least three different directions.

Further according to another exemplary embodiment the imaging device is packaged in a packaging unit including the controller and the plurality image-sensing devices and a band coupled to the packaging unit attaches the packaging unit to a wrist of a user of the imaging device.

Still further according to another exemplary embodiment the zoom operation is an electronic zoom and the at least one image-sensing device of the plurality of image-sensing devices is a wide-angle image-sensing device. Alternatively, or additionally, the at least one second image-sensing device is a wide-angle image-sensing device, and further alternatively or additionally, at least one first image-sensing device is a wide-angle image-sensing device.

Yet further according to another exemplary embodiment the controller is configured to control the first image-sensing device as a selfie camera directed at the user of the imaging device.

Even Still according to another exemplary embodiment the imaging device also includes a transmitter for communicating in a communication network, and the controller is configured to communicate the zoom part of the second image to at least one of a terminal of the communication network, and an intermediating communication node in the communication network.

Also, according to another exemplary embodiment the zoom operation may include selecting a part of the second image content, where the ratio between a measure of the selected part and the second image content decreases over time, at a predetermined rate, as long as the user looking direction is substantially maintained. The ratio between the measure of the zoom part and the original second image may reduce over time until a predetermined value is reached. Such predetermined value may represent an optical parameter such as granularity, and/or resolution.

Additionally, according to another exemplary embodiment the controller may analyze the first image content to determine a direction in which the user is looking by determining the direction of the position of the user's head, and/or the direction of the position of the user's eyes.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF THE EMBODIMENTS

The present embodiments comprise a method, one or more devices, and one or more software programs, enabling a user to orient an imaging device at a region of interest, capture an image including the region of interest, and concentrate the imaging on the region of interest, simply by looking at the region of interest. The method, and/or software programs of the present embodiments, are oriented at user portable imaging devices, including wearable imaging devices, including hand-held, and/or wrist mounted imaging devices.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Figure 1A:
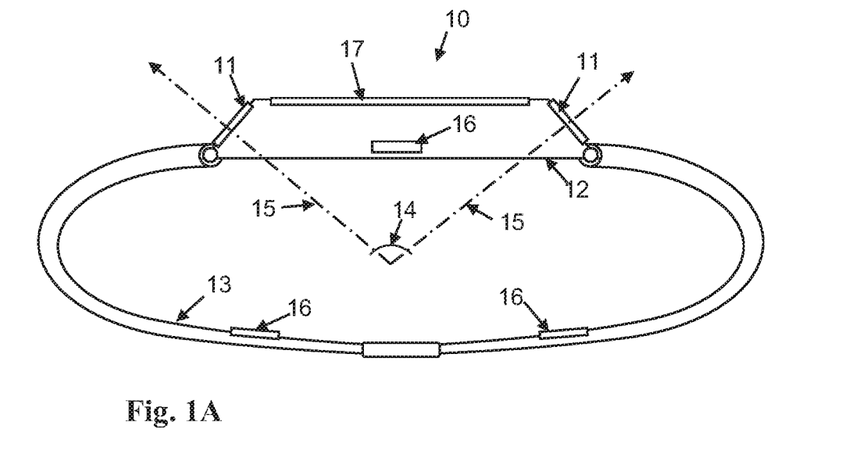
FIG. 1A is a simplified illustration of a side view of a wearable imaging device.
Figure 1B:
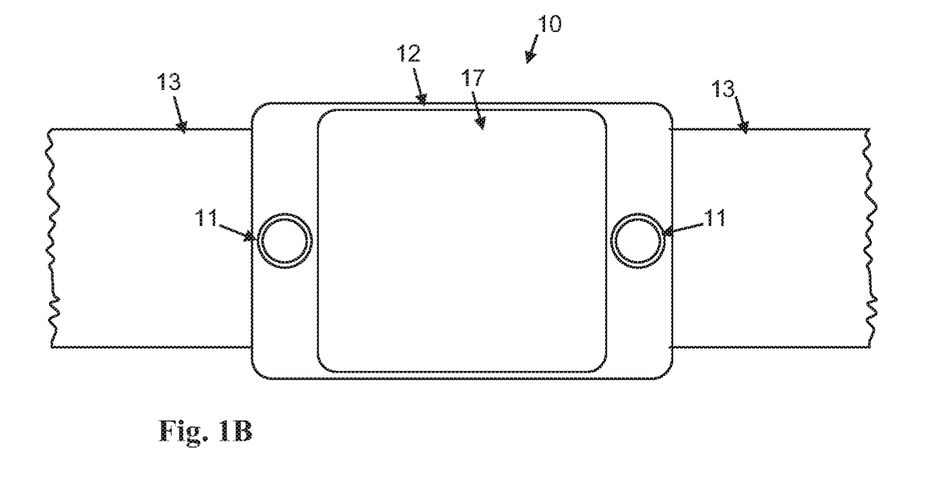
FIG. 1B is a simplified illustration of a top view of the wearable imaging device.

Reference is now made to FIG. 1A, which is a simplified illustration of a side view of a wearable imaging device 10, and to FIG. 1B, which is a simplified illustration of a top view of the wearable imaging device 10, according to one exemplary embodiment.

Wearable imaging device 10 may include at least two imaging units 11, a computational device 12 controllably and/or communicatively coupled to imaging devices 12, and a wearable article 13 coupled to the computational device 12. Wearable article 13 enables a user to wear the computational device 12 with the imaging units 11 on the user's body. In the example shown in FIGS. 1A and 1B, the wearable article 13 is a wrist band for wearing the imaging device 10 on the user's wrist.

The term 'imaging device' may refer to any type of camera, and/or optical sensor. However, the term 'imaging device' may have a broader sense referring to any type of audio-visual, or multimedia, sensor, including a three-dimensional (3D) imager, a radio frequency (RF) imager (e.g., radar), an ultra-sound imager, etc. It is appreciated that imaging units 11 may be of the same type or of different types.

The term 'computational device' may refer to any type of computer, or controller, or processing device as will be detailed below. The term 'wearable article' may refer to any type of article that can be worn by a user, or attached to a user, or carried by a user, and connect to the computational device 12 and/or imaging units 11.

As shown in FIGS. 1A and 1B, imaging units 11 may be mounted in substantially opposing directions so that a first imaging unit 11 may be directed towards the user (e.g., a selfie camera), and a second imaging unit 11 may be directed away from the user (e.g., a landscape camera). The selfie and landscape imaging units 11 may be mounted in an angle 14 of less than 180 degrees between the optical axes 15 of the lenses of the respective two imaging units 11, as shown in FIG. 1A. It is appreciated that angle 14 may be typically between 90 degrees and 180 degrees.

Any of the selfie and landscape imaging units 11 may be a wide-angle imaging device. Alternatively or additionally, any of the selfie and landscape imaging units 11 may include a plurality of relatively narrow-angle imaging units 11 that together form a wide-angle view.

Alternatively or additionally, any of the selfie and landscape imaging units 11 may include a combination of wide-angle and narrow-angle imaging units 11. Alternatively or additionally, any of the selfie and landscape imaging units 11 may be of a different type, or include a third imaging unit 11 of a different type. For example, the selfie imaging unit 11 may be a 3D imager, or an RF imager, or an ultrasound imager.

Wearable imaging device 10 (or computational device 12) may include haptic user-interface device 16. For example, the haptic user-interface device 16 may be a vibrating device, and/or an acoustic device, or any other device that can generate a signal to the user of the wearable imaging device 10 that the user can perceive without looking at the wearable imaging device 10.

As shown in FIGS. 1A, wearable imaging device 10 (or computational device 12) may include a plurality of haptic user-interface device 16, or a similar arrangement, that may enable a user to perceive (without looking at the wearable imaging device 10) a plurality of different signals such as 'up', 'down', 'left' 'right', etc.

Wearable imaging device 10 (or computational device 12) may also include a display 17 and/or any other type of user-interface device.

Figure 2:
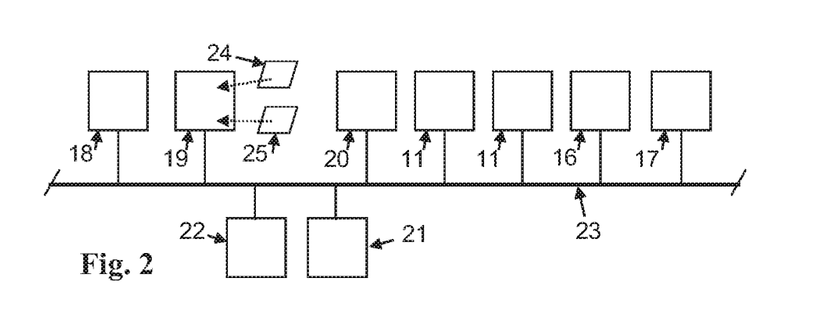
FIG. 2 is a simplified block diagram of a computational device with the imaging devices.

Reference is now made to FIG. 2, which is a simplified block diagram of computational device 12 with the imaging devices 11, according to one exemplary embodiment.

As an option, the wearable imaging device 26 of FIG. 2 may be viewed in the context of the previous Figures. Of course, however, FIG. 2 may be viewed in the context of any desired environment. Further, the aforementioned definitions may equally apply to the description below.

As shown in FIG. 2, computational device 12 may include a processor or controller 18, a memory and/or storage device 19, a communication device 20 such as a transceiver (or a receiver and transmitter devices), the two or more imaging units 11, one or more haptic user-interface device 16, a power supply 21 and power source 22 such as a battery, all connected via a bus 23. Computational device 12 may also include display 17, and/or any other type of user-interface device.

As shown in FIG. 2, memory and/or storage device 19 may include one or more software programs 24 and/or data 25, which may be executed and/or processed by processor 18 to control imaging units 11, and or communication device 20, and/or data 25. Data 25 may include imaging content captured by any of the imaging units 11. Such imaging content may include any type of imaging such as a still frame or a video stream.

Figure 3:
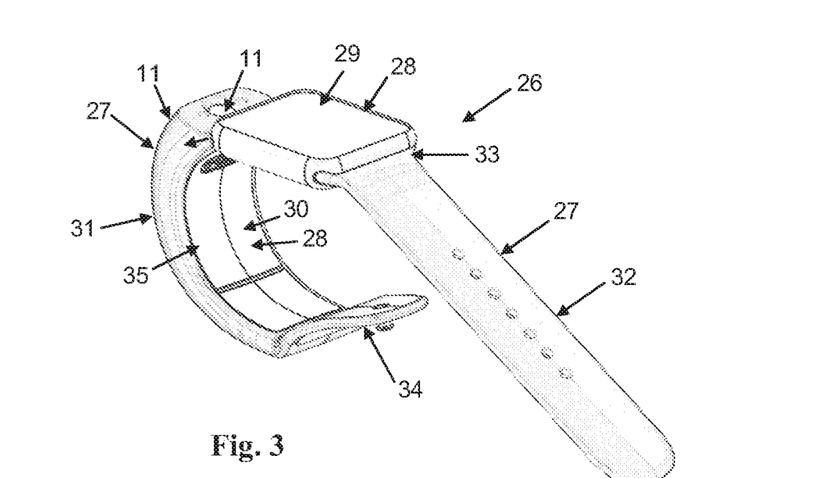
FIG. 3 is a simplified illustration of a wearable complex including a wearable article and two computational devices.

Reference is now made to FIG. 3, which is a simplified illustration of a wearable complex 26 including a wearable article 27 and two computational devices 28, at least one of which is an imaging device, according to one exemplary embodiment.

As an option, the wearable imaging device 26 of FIG. 3 may be viewed in the context of the previous Figures. Of course, however, the wearable imaging device 26 of FIG. 3 may be viewed in the context of any desired environment. Further, the aforementioned definitions may equally apply to the description below.

As shown in FIG. 3, wearable complex 26 may be designed to be warn on a user's limb, such as a user's extremity, such as a user's wrist. Thus, wearable complex 26 may include wearable article 27 in the form of a strip or a wrist-band arranged to attach the wearable complex 26 to a user's wrist, and one or more computational devices 28.

For example, wearable complex 26 may include a first computational device 28 such as a computerized watch, or a smartwatch, designated by numeral 29, and a second computational device 28 such as an imaging device designated by numeral 30. As shown in FIG. 3, imaging device 30 may include two or more imaging units 11.

Imaging units 11 of imaging device 30 may be mounted in substantially opposing directions so that a first imaging unit 11 may be directed towards the user (e.g., a selfie camera), and a second imaging unit 11 may be directed away from the user (e.g., a landscape camera). The selfie and landscape imaging units 11 may be mounted in an angle of less than 180 degrees between the optical axes of the lenses of the respective two imaging units 11, similar to the imaging units 11 shown in FIG. 1A. It is appreciated that angle 14 may be typically between 90 degrees and 180 degrees.

It is appreciated that wearable complex 26 may function like wearable imaging device 10 with the difference that wearable complex 26 may have more than one processor and its associated components, and that the two computational devices of wearable complex 26 may communicate via respective communication units.

As shown in FIG. 3, wearable complex 26 may include wearable article 27 including one or more band parts such as a first band part 31 and a second band part 32. Both the first band part 31 and the second band part 32 may include a connector 33 to connect the respective band part to the computerized watch 29 on either side of the computerized watch 29. First band part 31 and the second band part 32 may also include a respective buckle part 34 to connect the first band part 31 to the second band part 32. The first band part 31, or second band part 32 (or both) may also include the imaging device 30.

As shown in FIG. 3, wearable complex 26, via wearable article 27, may include a cavity 35, for example, within first band part 31. Cavity 35 may be arranged with its opening towards the user's wrist. The imaging device 30 may be inserted into cavity 35, via the cavity opening, before the wearable complex 26 is warn on the user's wrist so that the imaging device 30 may be secured between the cavity 35 and the user's wrist.

Imaging device 30 may include a plurality of imaging units 11. Typically, at least one imaging unit 11 is mounted as a selfie camera towards the user, and at least one imaging unit 11 is mounted as a landscape camera directed away from the user. FIG. 3 shows the selfie imaging unit 11 while the landscape imaging unit 11 is hidden behind wearable article 27.

Figure 4:
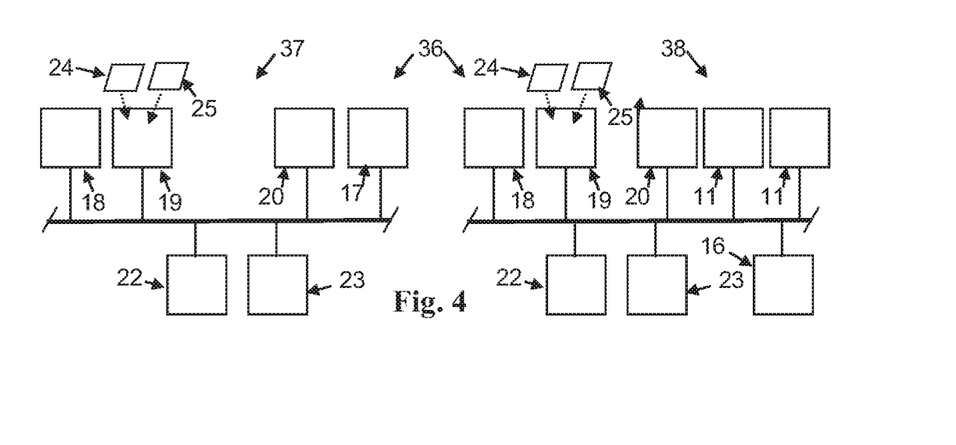
FIG. 4 is a simplified block diagram of wearable complex including a block diagram of a computational device and a block diagram of an imaging device.

Reference is now made to FIG. 4, which is a simplified block diagram 36 of wearable complex 26 including a block diagram 37 of computational device 29 (e.g. a smartwatch), a block diagram 38 of imaging device 30, according to one exemplary embodiment.

As an option, each of the block diagrams of FIG. 4 may be viewed in the context of the previous Figures. Of course, however, each of the block diagrams of FIG. 4 may be viewed in the context of any desired environment. Further, the aforementioned definitions may equally apply to the description below.

As shown in FIG. 4, block diagram 37 of computational device (computerized watch) 29 may include a processor 18, a memory and/or storage unit 19 including software program 24 and or data and/or content 25, a communication device 20, a display or any other user interface 17, a power supply 22 and a power source 23.

As shown in FIG. 4, block diagram 38 of computational device (imaging device) 30 may include a processor 18, a memory and/or storage unit 19 including software program 24 and or data and/or content 25, a communication device 20, two or more imaging units 11, one or more haptic user-interface device 16, a power supply 22 and a power source 23.

Figure 5A:
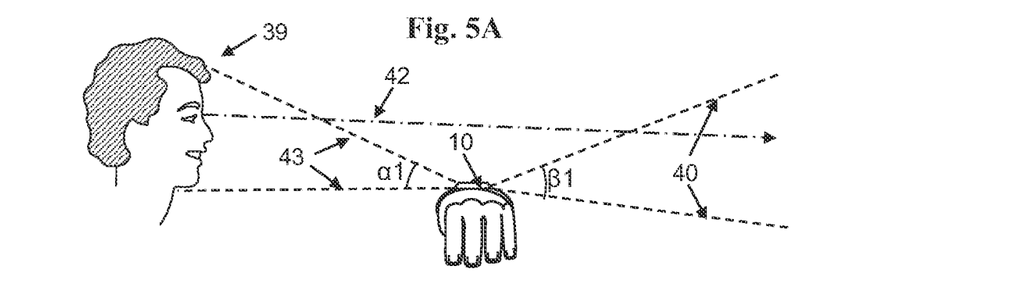
FIG. 5A is a simplified illustration of a side view of a user capturing a first image using wearable imaging device (or wearable complex)
Figure 5B:
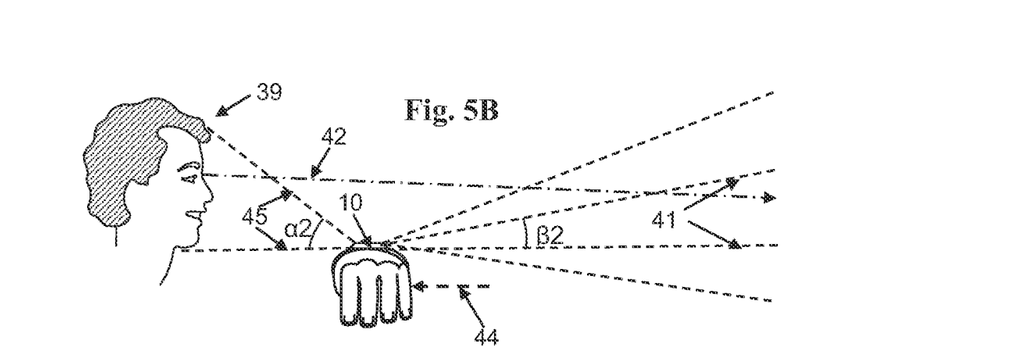
FIG. 5B is a simplified illustration of a side view of the user capturing a zoom image using wearable imaging device (or wearable complex)

Reference is now made to FIG. 5A, which is a simplified illustration of a side view of user 39 capturing a first image within borders 40 using wearable imaging device 10 (or wearable complex 26), and to FIG. 5B, which is a simplified illustration of a side view of user 39 capturing a zoom (second) image within borders 41 using wearable imaging device 10 (or wearable complex 26), according to one exemplary embodiment.

As an option, each of the illustrations of FIG. 5A and FIG. 5B may be viewed in the context of the previous Figures. Of course, however, each of the illustrations of FIG. 5A and FIG. 5B may be viewed in the context of any desired environment. Further, the aforementioned definitions may equally apply to the description below.

As shown in FIG. 5A and FIG. 5B, user 39 may position wearable imaging device 10 (or wearable complex 26) below (or above, etc.) the user's line-of-sight 42, so that wearable imaging device 10 (or wearable complex 26) does not block the user's view.

As shown in FIG. 5A, wearable imaging device 10 (or wearable complex 26) using selfie c imaging unit 11 may capture an image of user 39, and detect (43) the head of user 39 within the selfie image where the head of user 39 may be detected within an angle α1 or a similar measure of the head size (e.g., area).

As shown in FIG. 5B, user 39 may move wearable imaging device 10 (or wearable complex 26), for example, moving wearable imaging device 10 (or wearable complex 26) closer to user 39, where the motion is indicated by arrow 44. Thus, the head of the user 39 may be detected (45) within the selfie image within an angle α2 (or a similar measure of the head size) where α2>α1.

Consequently, responsive to the change in the angle α (or a change of a similar measure) wearable imaging device 10 (or wearable complex 26) may change an angle β, of an image captured by the landscape imaging unit 11, and thus effect a zoom function on the image captured by landscape imaging unit 11. For example, as shown in FIGS. 5A and 5B, angle β2<angle β1.

The term 'concentration', or 'image selection', or 'zoom', or 'zoom function', or 'zoom operation', may refer to selecting any part of an image taken by an imaging unit. For simplicity, the term 'zoom' may be used, referring to any of the above terms. For example, the term 'zoom' may refer to any type of imaging effect that determines a partial field of view within the overall field of view of the imaging device. The term 'zoom' here may refer to 'electronic zoom', where the zoom function is provided by processing the image captured by the imaging device to select the zoom image. For example, the term 'zoom' may refer to selecting a particular narrow-angle view from a wide-angle image captured, for example, by a landscape imaging unit 11.

The term 'zoom' may also refer to selecting any part of an image (i.e., zoom part) concentrated around, or withing a 'region of interest' of the user operating the imaging device (locally or remotely). Additionally, the term 'zoom' may include selecting an aspect ratio of the selected part of the image, or zoom part, which may be different from the aspect ratio (ratio between the vertical measure and the horizontal measure) of the image as originally captured by the imaging device.

The term 'zoom' may also refer to selecting or identifying a 'region of interest' or an 'object of interest'. In this respect, the 'region of interest' or an 'object of interest' is marked within the original image captured by the imaging device. For example, the 'region of interest' or the 'object of interest' is marked for post-processing.

Post processing may be executed by the capturing and/or transmitting device, and/or by the receiving device, and/or by one or more intermediating servers in the network. For example, in cases such as post-processing by a computational device other than the capturing and/or transmitting device, the capturing and/or transmitting device communicates the original image as captured with the marking of the 'region of interest' and/or the 'object of interest'.

For this matter, with the availability of a plurality of cameras positioned in different directions, zoom may be effected by selecting a camera that is better pointed at the selected direction, or object.

Typically, the selected part, or zoom part, of the image, may be communicated to any number of remote entities, such as a remote terminal, or a node (server) in an intermediate location in a communication network. The image may be any type of image such as a still image and/or a video stream.

It is appreciated that the zoom operation may affect the location of the selected part within the entire (original) image as captured by the landscape imaging unit 11, and/or the relative size of the selected part as part of the entire (original) image as captured by the landscape imaging unit 11

It is appreciated that any object (such as the head of the user serving as an example) captured by the selfie imaging unit 11 may serve to provide a measure forming the basis for controlling the zoom function. For example, the size of the object with respect to the entire image as captured by the selfie imaging unit 11. For example, the change of size of the object with respect to the entire image as captured by the selfie imaging unit 11. For example, the position of the object withing the frame of the entire image as captured by the selfie imaging unit 11. For example, the orientation of the object with respect to the entire image as captured by the selfie imaging unit 11 (e.g., the direction in which the user is looking).

It is appreciated that any logic may be applied to correlate between the images captured by the selfie imaging unit 11 to affect the zoom operation. Such logic may be a correlation between one or more images captured by selfie imaging unit 11, affecting a correlated, or an opposite (inverse) correlated zoom between one or more images captured by landscape imaging unit 11.

It is appreciated that any motion in the image captured by the selfie imaging unit 11 to affect the zoom operation the landscape imaging unit 11. For example, moving the wearable imaging device 10 (or wearable complex 26) closer to the user, or away from the user, or up, or down, or to the left, or to the right, with respect to the user, or any type of rotation of wearable imaging device 10 (e.g., six degrees of freedom).

Figure 6A:
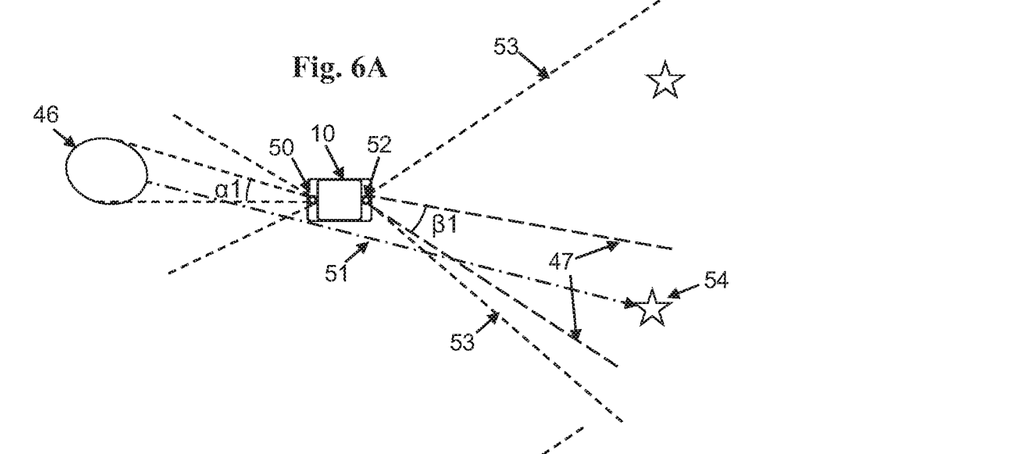
FIG. 6A is a simplified illustration of a top view of a user capturing a first zoom image using wearable imaging device (or wearable complex)
Figure 6B:
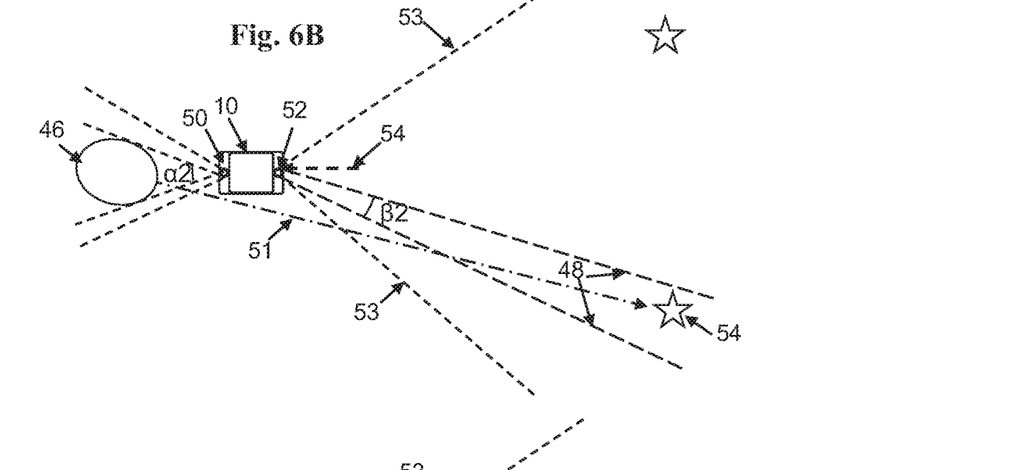
FIG. 6B is a simplified illustration of the user capturing a second zoom image using wearable imaging device (or wearable complex)
Figure 6C:
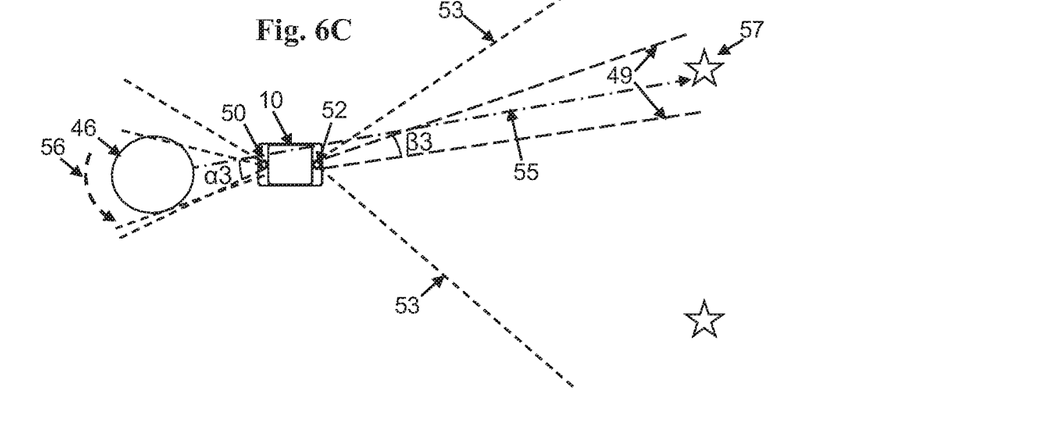
FIG. 6C is a simplified illustration of the user capturing a third zoom image 1 using wearable imaging device (or wearable complex)

Reference is now made to FIG. 6A, which is a simplified illustration of a top view of a user 46 capturing a first zoom image 47 using wearable imaging device 10 (or wearable complex 26), to FIG. 6B, which is a simplified illustration of user 46 capturing a second zoom image 48 using wearable imaging device 10 (or wearable complex 26), and to FIG. 6C, which is a simplified illustration of user 46 capturing a third zoom image 49 using wearable imaging device 10 (or wearable complex 26), according to one exemplary embodiment.

As an option, each of the illustrations of FIG. 6A, FIG. 6B and FIG. 6C may be viewed in the context of the previous Figures. Of course, however, each of the illustrations of FIG. 6A, FIG. 6B and FIG. 6C may be viewed in the context of any desired environment. Further, the aforementioned definitions may equally apply to the description below.

As shown in FIG. 6A, imaging unit 11 being a selfie imaging unit 50 may have captured the head of user 46, and may have detected a measure of the head, such as angle α1, as well as the direction of the head representing the user's line-of-sight 51.

Typically substantially simultaneously, imaging unit 11, being a landscape imaging unit 52, may have captured a wide angle image as indicated by the field-of-view borders 53. Within the wide angle image (as originally captured by imaging unit 11), imaging unit 11 may have determined a region (or object) of interest, and/or concentrated on a zoom image of an object 54 in the line-of-sight 51.

The zoom, as indicated by angle 131, may be proportionate (or (inversely proportionate) to the measure of the head as captured by selfie imaging unit 50. Namely, angle 131 is (inversely) proportionate to angle α1. In the example of FIGS. 6A and 6B the zoom, or change of angle β, is inversely proportionate to the change if angle α.

As shown in FIG. 6B, user 46 may have moved imaging device 10 (or wearable complex 26) closer to the user's head, where the motion is indicated by arrow 54. Consequently, imaging unit 11 being a selfie imaging unit 50 may have captured the head of user 46, and may have detected a measure of the head, such as angle α2, as well as the direction of the head representing the user's line-of-sight 51.

Consequently, imaging unit 11 being a landscape imaging unit 52 may have captured a zoom image of an object 54 in the line-of-sight 51 where the zoom, as indicated by angle 132, is increased (inversely proportionate) to the measure of the head as captured by selfie imaging unit 50. Namely, angle β2/β1 is decreased (inversely proportionate) to the increased angle α2>α1.

As shown in FIG. 6C, imaging unit 11 being a selfie imaging unit 50 may have captured the head of user 46, and may have detected a measure of the head, such as angle α2, as well as the change of direction of the head representing the user's current line-of-sight 55. The change of direction of the head is indicated by arrow 56, resulting in the change of direction of the user's line-of-sight.

Consequently, imaging unit 11 being a landscape imaging unit 52 may have captured a zoom image of an object 57 in the line-of-sight 55 where the zoom, as indicated by angle β3, is adapted to the measure of the head as captured by selfie imaging unit 50 (e.g., angle α3).

Figure 7A:
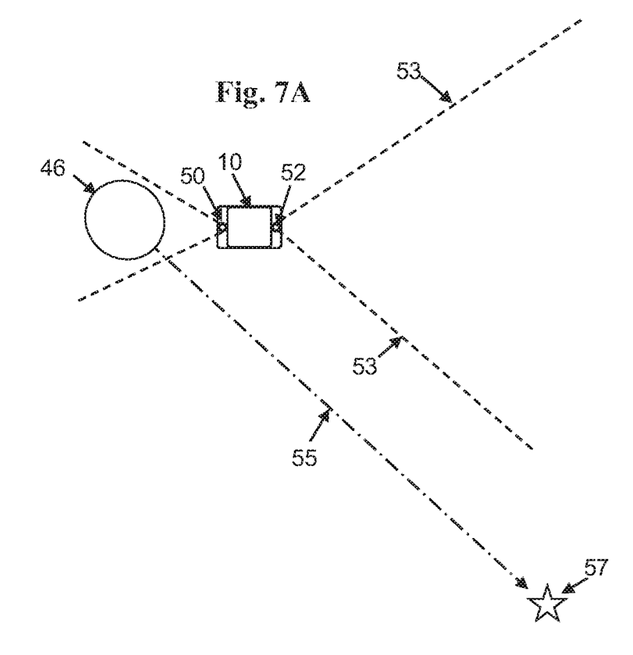
FIG. 7A is a simplified illustration of a top view of a user and a wearable imaging device (or wearable complex) not aligned with the user's line-of-sight.
Figure 7B:
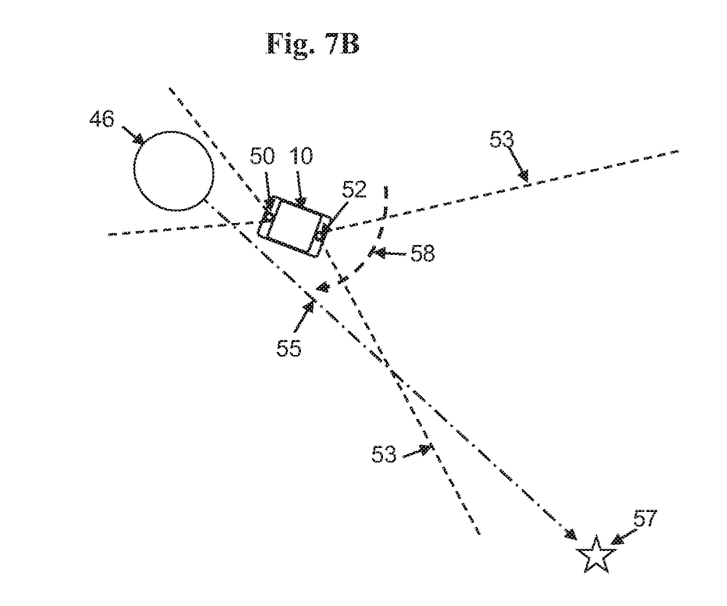
FIG. 7B is a simplified illustration of a top view of a user and a wearable 115 imaging device (or wearable complex) moved to be aligned with the user's line-of-sight.

Reference is now made to FIG. 7A, which is a simplified illustration of a top view of a user 46 and an unaligned wearable imaging device 10 (or wearable complex 26), and to FIG. 7B, which is a simplified illustration of a top view of a user 46 and an aligned wearable imaging device 10 (or wearable complex 26), according to one exemplary embodiment.

As an option, each of the illustrations of FIG. 7A and FIG. 7B may be viewed in the context of the previous Figures. Of course, however, each of the illustrations of FIG. 7A and FIG. 7B may be viewed in the context of any desired environment. Further, the aforementioned definitions may equally apply to the description below.

As shown in FIG. 7A, selfie imaging unit 50 may have captured an image of the head of user 46 and wearable imaging device 10 (or wearable complex 26) may have determined that user 46 is looking at a direction indicated by line-of-sight 55. wearable imaging device 10 (or wearable complex 26) may have also determined that line-of-sight 55 is outside the angle, or field of view, of landscape imaging unit 52 (as indicated by borders 53.

Consequently, wearable imaging device 10 (or wearable complex 26) may operate haptic user-interface device 16 to signal to user 46 that wearable imaging device 10 (or wearable complex 26) and/or landscape imaging unit 52 is not aligned with user's 46 line-of-sight 55.

As shown in FIG. 7B, responsive to the haptic signal generated by haptic user-interface device 16, user 46 may change the orientation of wearable imaging device 10 (or wearable complex 26), for example by rotating wearable imaging device 10 (or wearable complex 26) as indicated by arrow 58.

For example, user 46 may change the orientation of wearable imaging device 10 (or wearable complex 26) until wearable imaging device 10 (or wearable complex 26) may determine that line-of-sight 55 is inside the angle, or field of view, of landscape imaging unit 52. When imaging device 10 (or wearable complex 26) may determine that line-of-sight 55 is inside the angle, or field of view, of landscape imaging unit 52 imaging device 10 (or wearable complex 26) may stop the haptic signal, to signal to user 46 that landscape imaging unit 52 or aligned, or oriented, with line-of-sight 55.

For example, at this point imaging device 10 (or wearable complex 26) may determine that object 57 constitute a region (or an object) of interest. For example, at this point imaging device 10 (or wearable complex 26) may execute the zoom functions as described above with reference to FIGS. 5A and 5B, and FIGS. 6A, 6B, and 6C.

FIGS. 7A and 7B show horizontal orientation, or alignment, of the imaging device 10 (or wearable complex 26) with line-of-sight 55. However, it is appreciated that the orientation, or alignment, of the imaging device 10 (or wearable complex 26) with line-of-sight 55 may take effect in six degrees of freedom. For that matter, haptic user-interface device 16 may have a plurality of signal to indicate any number of orientation motions, or alignment motions, as deemed required. Alternatively, or additionally, imaging device 10 (or wearable complex 26) may use a plurality of haptic user-interface device 16 to indicate different orientation motions, or alignment motions.

Therefore, combining the description above with reference to FIGS. 5A and 5B, and FIGS. 6A, 6B, and 6C as well as FIGS. 7A and 7B, it is appreciated that a user (e.g., user 46) of wearable imaging device 10 (or wearable complex 26) may move wearable imaging device 10 (or wearable complex 26) look in a particular direction to indicate a region of interest (or an object of interest). The direction in which the user is looking may be determined, for example, by selfie imaging unit 50.

Then the user may move wearable imaging device 10 (or wearable complex 26) to concentrate the imaging post-processing on the region of interest (or an object of interest) within the image captured by landscape imaging unit 52. Such imaging post-processing may be effected, for example, by electronic zoom, which may determine a narrow angle of view (or narrow field-of-view) such as angle β1, β2, and/or β3 within the image captured by landscape imaging unit 52. Alternatively, wearable imaging device 10 (or wearable complex 26) may select one of a plurality of narrow angle landscape imaging units 52, where the selected landscape imaging unit 52 is pointed at the region of interest (or an object of interest).

Wearable imaging device 10 (or wearable complex 26) may then determine, for example, that as a result of the motion of wearable imaging device 10 (or wearable complex 26), the direction in which the user is looking, and/or the region of interest (or an object of interest) is outside the field of view of landscape imaging unit 52 (or the plurality of landscape imaging units 52). The wearable imaging device 10 (or wearable complex 26) may then generate a haptic signal, for example by using haptic user-interface device 16, to indicate to the user to move (e.g., rotate) wearable imaging device 10 (or wearable complex 26) until the landscape imaging unit 52 (or at least one of the plurality of landscape imaging units 52) can capture an image of the region of interest (or an object of interest).

As described above, wearable imaging device 10 (or wearable complex 26) may operate any number of haptic user-interface devices 16 to emit to the user any number of signals perceived by the user. The one or more signals indicating to the user any number of maneuvering methods and/or directions of motion of the wearable imaging device 10 (or wearable complex 26), and to direct the user to move the wearable imaging device 10 (or wearable complex 26) to capture a region of interest (or an object of interest) in the direction in which the user is looking.

The signals may be haptic, such as vibration, or audible, or any other signal that the user may perceive and interpret accordingly. For example, a different vibration rate, a different pitch (frequency) of sound, a different rhythm, or cadence, of vibrations, or sounds, etc.

Such signal may imply a measure of the difference between the current direction of the landscape imaging unit 52 (or at least one of the plurality of landscape imaging units 52) and the direction in which the user is looking. For example, by inducing a changing vibration rate, or a changing pitch of sound, etc.

Additionally or alternatively, the wearable imaging device 10 (or wearable complex 26) may operate a plurality of vibrating elements distributed on the wrist band may also indicate how to move the wearable imaging device 10 (or wearable complex 26) to capture a region of interest (or an object of interest) in the direction in which the user is looking.

It is therefore appreciated that the imaging device such as the wearable imaging device 10, and/or a method implemented by the imaging device, and/or a software program executed by the wearable imaging device 10, may enable a user capturing an image, to focus, and/or zoom, the image, on an object, simply by looking at the object.

As described above, the imaging device may include a plurality of image-sensing devices comprising at least a first image-sensing device and a second image-sensing device mounted to capture a second image in substantially opposing direction to a first image captured by the first image-sensing device, and a controller communicatively coupled to the at least first image-sensing device and second image-sensing device.

The controller may capture the first image content from the first image-sensing device, and the second image content from the second image-sensing device, substantially simultaneously. The controller may then analyze the first image content to detect a user of the imaging device, to determine a direction in which the user is looking, forming a user looking direction. The controller may then capture the second image from the second image-sensing device, and zoom the second image in the user looking direction by selecting a part of the second image concentrated in the user looking direction.

Alternatively, or additionally, the controller may zoom the second image by selecting a second image-sensing device from the plurality of image sensing devices, where the selected second image-sensing device is directed in the user looking direction, and wherein the at least two image-sensing devices comprise at least three image-sensing mounted in respective at least three different directions.

The imaging device may be packaged in a packaging unit including the controller and the plurality image-sensing devices and a band coupled to the packaging unit attaches the packaging unit to a wrist of a user of the imaging device.

The zoom operation may be performed as an electronic zoom, and at least one image-sensing device of the plurality of image-sensing devices may be a wide-angle image-sensing device. Alternatively, or additionally, the second image-sensing device may be a wide-angle image-sensing device, and further alternatively or additionally, the first image-sensing device may be a wide-angle image-sensing device. The controller may control the first image-sensing device as a selfie camera directed at the user of the imaging device.

The imaging device may further include a transmitter for communicating in a communication network, and the controller may use the transmitter to communicate the zoom part of the second image to at least one of a terminal of the communication network, and an intermediating communication node in the communication network.

The zoom operation may include selecting a part of the second image content, by keeping a ratio between a measure of the selected part and the second image content. The ratio may decrease over time, for example at a predetermined rate, for example as long as the user looking direction is substantially maintained. The ratio between the measure of the zoom part and the original second image may reduce over time until a predetermined value is reached. Such predetermined value may represent an optical parameter such as granularity, and/or resolution.

The controller may also analyze the first image content to detect a user, such as the user of the imaging device, and to determine a direction in which the user is looking, for example, by determining the direction of the position of the user's head, and/or the direction of the position of the user's eyes. Such analysis may form a user looking direction.

The controller may also determine the field of view of the second image-sensing device, as shown in FIG. 7A and FIG. 7B by borders 53. The controller may then provide a signal to the user if the direction in which the user is looking is not within the field of view of the landscape (second) image-sensing device, such as imaging unit 52.

The signal provided by the controller to the user may include a haptic signal that can be perceived by the user of the imaging device. The haptic signal may include one or more vibration signals, and/or one or more auditory signals. Such auditory signal may include a verbal instruction.

The haptic signal may include any number of different signals that may indicate to the user a direction and/or mode of moving the imaging device to align the landscape (second) image-sensing device, such as imaging unit 52 with the user's looking direction. Such plurality of signals may indicate, for example, up, down, right, left, etc. Such as six degrees of motion.

The controller may cease the signal to the user when the controller determines that the direction in which the user is looking is within the field of view of the landscape (second) image-sensing device.

The controller may change the signal to the user according to a difference between the direction in which the user is looking and the field of view of the second image-sensing device. For example, such change may affect an amplitude, and/or frequency, and or cadence, of the vibration, or auditory signal.

Figure 8A:
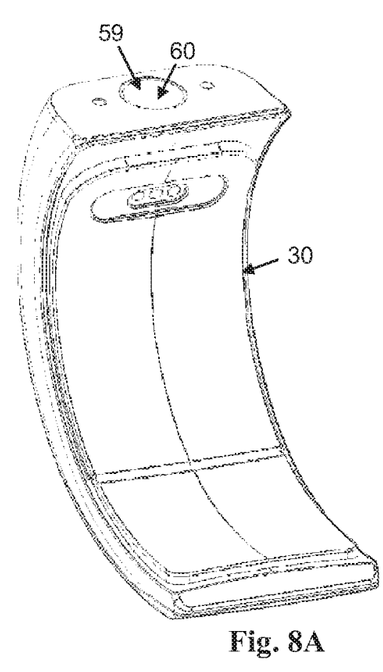
FIG. 8A is a simplified illustration of an imaging device from the inward (wrist) side.
Figure 8B:
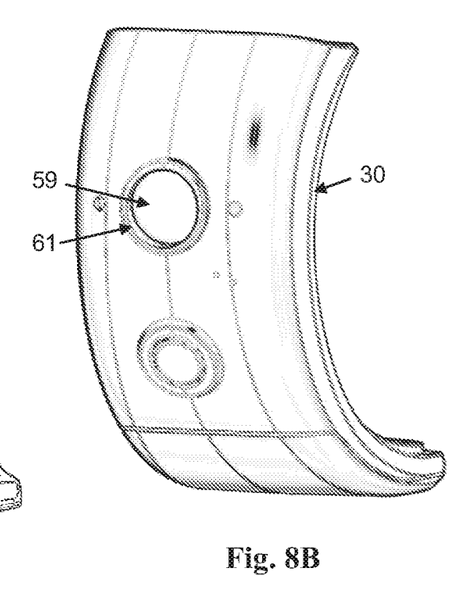
FIG. 8B is a simplified illustration of the imaging device from the outward 120 side.
Figure 8C:
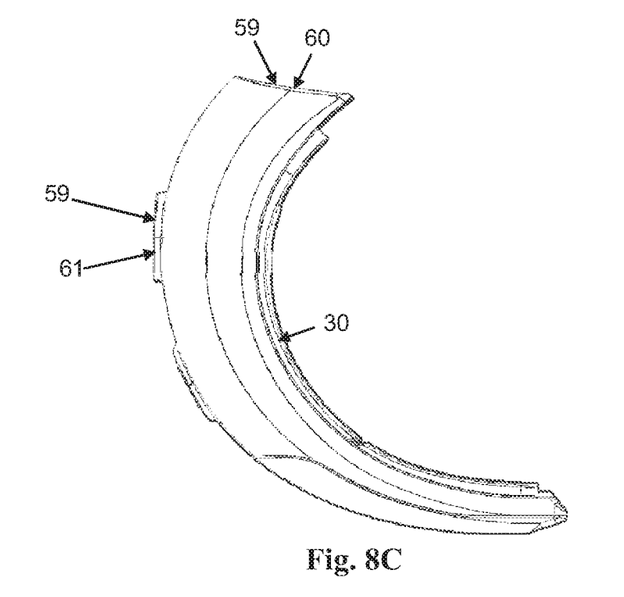
FIG. 8C is a side view of the imaging device.

Reference is now made to FIG. 8A, which is a simplified illustration of imaging device 30 from the inward side, and to FIG. 8B, which is a simplified illustration of imaging device 30 from the outward side, and to FIG. 8C, which is a side view of imaging device 30, according to one exemplary embodiment.

As an option, the illustrations of FIGS. 8A and 8B may be viewed in the context of the previous Figures. Of course, however, the illustrations of FIGS. 8A and 8B may be viewed in the context of any desired environment. Further, the aforementioned definitions may equally apply to the description below.

FIG. 8A shows imaging device 30 from the side facing the wrist, and that FIG. 8B shows imaging device 30 from the side away from the wrist. As an option, the illustrations of FIG. 8A, FIG. 8B, and FIG. 8C may be viewed in the context of the previous Figures. Of course, however, the illustrations of FIG. 8A, FIG. 8B, and FIG. 8C may be viewed in the context of any desired environment. Further, the aforementioned definitions may equally apply to the description below.

Imaging device 30 may include one or more imaging sensors 59 such as a camera. For example, imaging device 30 may include a first imaging sensor (camera) 59 designated by numeral 60 and oriented in a first direction, such as outwards, substantially away from the user, and a second imaging sensor (camera) 59 designated by numeral 61 and oriented in a second direction (e.g., inwards, substantially towards the user). Imaging device 30 may be inserted into cavity 35 of wearable complex 26 and/or first band part 31.

Reference is now made to FIG. 9A, FIG. 9B, FIG. 9C, and FIG. 9D, which are simplified illustrations of a first band part 31 including cavity 35, according to one exemplary embodiment.

As an option, the illustrations of FIG. 9A, FIG. 9B, FIG. 9C, and FIG. 9D, may be viewed in the context of the previous Figures. Of course, however, the illustrations of FIG. 9A, FIG. 9B, FIG. 9C, and FIG. 9D, may be viewed in the context of any desired environment. Further, the aforementioned definitions may equally apply to the description below.

Figure 9A:
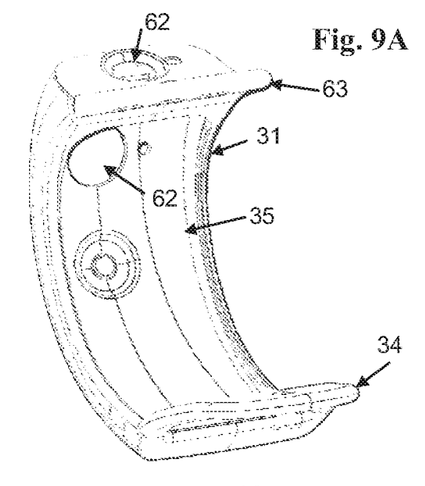
FIG. 9A is simplified illustration of a first view of a first band part including cavity.
Figure 9B:
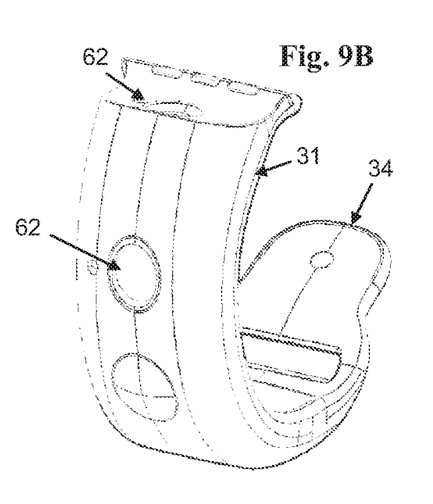
FIG. 9B is simplified illustration of a second view of the first band part including cavity.

It is appreciated that cavity 35 is illustrated as a part of first band part 31 as an example, and that cavity 35 may be part of second band part 32.

It is appreciated that cavity 35 has the shape of imaging device 30 and/or imaging device 30 has the shape of cavity 35.

As shown in FIGS. 9A, 9B, 9C, and 9D, first band part 31 may include one or more openings 62, such as a hole, to expose a respective imaging sensor (camera) 59 of imaging device 30, and particularly, to expose a lens of imaging sensors 59. Consequently, imaging device 30 may include at least one sensor (camera) having a lens arranged to fit against the respective openings 62 (hole) in cavity 35.

The first band part 31 may also include a connector element 63 to connect to computational device 28, such as the first computational device 29, such as a smart watch. The connector 63 may be included at an end of the first band part 31.

The first band part 31 may also include a connector, such as a buckle part 34, to connect to the second band part 32. The buckle part 34 may be included at an end of the first band part 31, such as the end opposite to connector 63.

The second band part 32, similarly to the first band part 31, may include a third end part including a connector to connect to computational device 28, such as the a first computational device 29, such as a smart watch, and a fourth end part including a connector to connect to the buckle part 34 of the first band part 31. Therefore, the wearable complex 26, including the first band part 31, the computational device 28, and the second band part 32, may be wrapped around a user's wrist.

Figure 9C:
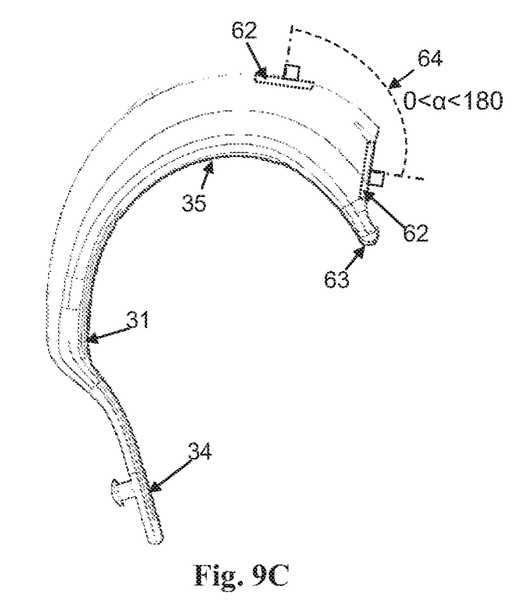
FIG. 9C is simplified illustration of a side view of the first band part including cavity.
Figure 9D:
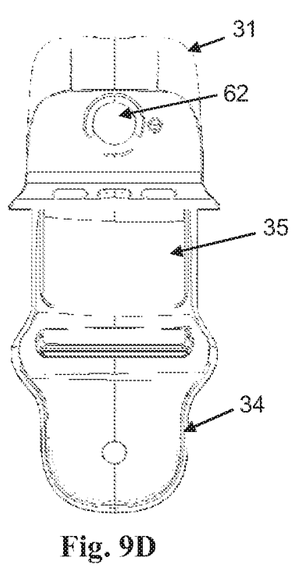
FIG. 9D is simplified illustration of an inner view of the first band part including cavity.

As shown in FIG. 9C, cavity 35 may include two openings 62 (hole) for the two imaging sensors 59 (e.g., cameras) with an angle 64 between the openings 62. As shown in FIG. 9C, angle 64 may be measured between the respective axes that are each perpendicular to the area of the respective opening 62 at the center of the opening 62. Alternatively, angle 64 may be measured between the respective plains of openings 62. As shown in FIG. 9C, angle 64 may have a value that is larger than zero and smaller than 180 degrees. Particularly, angle 64 may have a value between 30 and 120 degrees.

It is appreciated that the angle between the optical axes of the lenses of the respective two imaging sensors 59 is equal to angle 64. The optical axis of imaging sensor 59 being measured as the perpendicular to the area of the lens at the center of the lens.

As shown in FIG. 3, at least one of the imaging sensors 59 may be mounted with an angle between the imaging sensor 59 and the plain of the screen display of the computerized watch (smartwatch) 29. The angle being measured, for example, between the optical axis of the imaging device and the perpendicular to the surface of the screen display. This angle may be larger than zero and smaller than 90 degrees.

Altogether, the wearable article 27, and particularly the first band part 31 on which the two imaging sensors 59 are mounted, may have the shape where the two openings 62, and therefore the lenses of the two imaging sensors 59, are arranged with an angle between the cameras and the plain of the screen display of the computerized watch (smartwatch) 29 that is larger than zero and smaller than 90 degrees, and an angle 64 between the two imaging sensors 59 that is larger than zero and smaller than 180 degrees.

Figure 10:
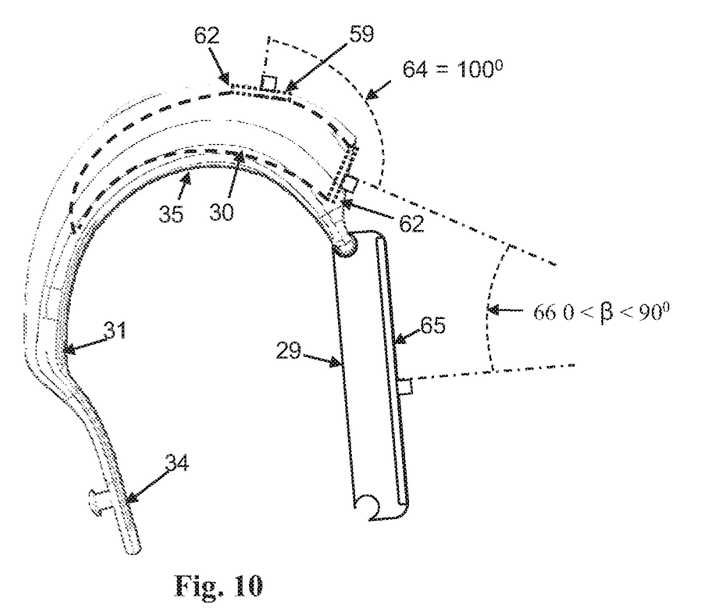
FIG. 10 is a simplified illustrations of first band part 31 attached to first computational device 29 and including second computational device 30 in cavity 35.

Reference is now made to FIG. 10, which is simplified illustrations of first band part 31 attached to first computational device 29 and including second computational device 30 in cavity 35, according to one exemplary embodiment.

As an option, the illustration of FIG. 10, may be viewed in the context of the previous Figures. Of course, however, the illustrations of FIG. 10, may be viewed in the context of any desired environment. Further, the aforementioned definitions may equally apply to the description below.

Computational device 29 may be a computerized watch, or a smartwatch, which may include a display 65. The second computational device 30 may be an imaging device and may include two imaging sensors 59. The first band part 31 may include cavity 35, which may include two openings 62 adapted for the two imaging sensors 59. As an example, the two openings 62 of FIG. 10 are arranged with an angle of 90 degrees between the planes of the openings 62. As an example, the two imaging sensors 59 of second computational device 30 may be arranged with an angle (64) of 100 degrees between the planes of the lenses of imaging sensors 59 (or between the optical axes if imaging sensors 59). Hence, an opening 62 may be adapted to allow the plane of the lens to be in an angle to the plane of the opening.

As shown in FIG. 10, at least one of the openings 62 and/or imaging sensors 59 may be in an angle 66 to the plane of display 65. Angle 66, between the optical axis of imaging sensors 59 and the perpendicular to the plane of display 65, may have a value that is greater zero and less than 90 degrees.

For example, one of the imaging sensors 59 may have an angle between zero and 90 degrees between its optical axis and the perpendicular to the to the plane of display 65, and the other imaging sensors 59 may have an angle between 90 and 180 degrees between its optical axis and the perpendicular to the to the plane of display 65.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation, or identification of any reference in this application shall not be construed as an admission that such reference is available as prior art.

What is claimed is:

1. An imaging device comprising:
    a plurality of image-sensing devices comprising at least a first image-sensing device and a second image-sensing device mounted to capture a second image in substantially opposing direction to a first image captured by the first image-sensing device;
    a controller communicatively coupled to the at least first image-sensing device and second image-sensing device;
    wherein the controller is configured to:
        capture the first image content from the first image-sensing device, and the second image content from the second image-sensing device, substantially simultaneously;
        analyze the first image content to detect a user of the imaging device, and to determine a direction in which the user is looking, to form a user looking direction, wherein the looking direction is not in the direction of the first images sensing device;
        capture the second image from the second image-sensing device; and
        at least one of:
            zoom the second image in the user looking direction; and
            select a second image-sensing device from the plurality of image sensing devices, wherein the selected second image-sensing device is directed in the user looking direction, and wherein the at least two image-sensing devices comprise at least three image-sensing mounted in respective at least three different directions.

2. The imaging device according to claim 1, additionally comprising:
    a packaging unit comprising the controller and the plurality image-sensing devices; and
    a band coupled to the packaging unit for attaching the packaging unit to a wrist of a user of the imaging device.

3. The imaging device according to claim 1, wherein the zoom is an electronic zoom and wherein:
    at least one image-sensing device of the plurality of image-sensing devices is a wide-angle image-sensing device;
    at least one second image-sensing device is a wide-angle image sensing device; and
    at least one first image-sensing device is a wide-angle image-sensing device.

4. The imaging device according to claim 1, wherein the controller is configured to control the first image-sensing device as a selfie camera directed at the user of the imaging device.

5. The imaging device according to claim 1, additionally comprising:
    a transmitter for communicating in a communication network; and
    wherein the controller is configured to communicate the zoom part of the second image to at least one of a terminal of the communication network, and an intermediating communication node in the communication network.

6. The imaging device according to claim 1, wherein the zoom comprises selecting a part of the second image content and wherein the ratio between a measure of the selected part and the second image content decreases with time at a predetermined rate as long as the user looking direction is substantially maintained.

7. The imaging device according to claim 6, wherein the ratio between a measure of the zoom part and the original second image reduces with time until a predetermined value is reached (granularity, resolution).

8. The imaging device according to claim 1, wherein the controller analyzes the first image content to determine a direction in which the user is looking by determining at least one of:
    direction of the position of the user's head; and
    direction of the position of the user's eyes.

9. A method for selecting a part of an image, the method comprising:
    capturing a first image content from a first image-sensing device, and a second image content from a second image-sensing device, wherein the first image-sensing device and the second image-sensing device are mounted to capture images in substantially opposing directions, and wherein the first image content and the second image content being captured substantially simultaneously;
    analyzing the first image content to detect a user of the imaging device, and to determine a direction in which the user is looking, to a form user looking direction, wherein the looking direction is not in the direction of the first image sensing device; and
    at least one of:
        selecting a part of the second image according to the user looking direction; and
        selecting a secondary image-sensing device from the plurality of secondary image sensing devices, wherein the second image device comprises a plurality of secondary image devices directed in different directions, and wherein the selected second image-sensing device is directed in the user looking direction.

10. The method according to claim 9, additionally comprising:
    attaching the first image-sensing device and the second image-sensing device to a wrist of a user.

11. The method according to claim 9, additionally comprising:
    using electronic zoom for selecting a part of the second image according to the user looking direction, wherein at least one of:
        at least one image-sensing device of the plurality of image-sensing devices is a wide-angle image-sensing device;
        at least one second image-sensing device is a wide-angle image sensing device; and
        at least one first image-sensing device is a wide-angle image-sensing device.

12. The method according to claim 9, additionally comprising:
    using the first image-sensing device as a selfie camera directed at the user of the imaging device.

13. The method according to claim 9, additionally comprising:
    communicating the selected part of the second image to at least one of a terminal of the communication network, and an intermediating communication node in the communication network.

14. The method according to claim 9, additionally comprising:
    selecting a part of the second image content, wherein the ratio between a measure of the selected part and the second image content decreases with time at a predetermined rate as long as the user looking direction is substantially maintained.

15. The method according to claim 14, wherein the ratio between the measure of the selected part and the second image content decreases with time until a predetermined value is reached.

16. The method according to claim 9, additionally comprising:
    analyzing the first image content to determine a direction in which the user is looking by determining at least one of:
        direction of the position of the user's head; and
        direction of the position of the user's eyes.

17. A computer program product embodied on a non-transitory computer readable medium, including instructions that, when executed by at least one processor, cause the processor to perform operations comprising:
    capturing a first image content from a first image-sensing device, and a second image content from a second image-sensing device, wherein the first image-sensing device and the second image-sensing device are mounted to capture images in substantially opposing directions, and wherein the first image content and the second image content being captured substantially simultaneously;
    analyzing the first image content to detect a user of the imaging device, and to determine a direction in which the user is looking, to form a user looking direction, wherein the looking direction is not in the direction of the first image sensing device; and
    at least one of:
        selecting a part of the second image according to the user looking direction; and
        selecting a secondary image-sensing device from the plurality of secondary image sensing devices, wherein the second image device comprises a plurality of secondary image devices directed in different directions, and wherein the selected second image-sensing device is directed in the user looking direction.

18. The computer program product according to claim 17, additionally comprising
    instructions to perform operations comprising at least one of:
    using electronic zoom for selecting a part of the second image according to the user looking direction, wherein at least one of:
        at least one image-sensing device of the plurality of image-sensing devices is a wide-angle image-sensing device;
        at least one second image-sensing device is a wide-angle image sensing device; and
        at least one first image-sensing device is a wide-angle image-sensing device; and
    using the first image-sensing device as a selfie camera directed at the user of the imaging device.

19. The computer program product according to claim 17, additionally comprising instructions to perform operations:
    communicating the selected part of the second image to at least one of a terminal of the communication network, and an intermediating communication node in the communication network.

20. The computer program product according to claim 17, additionally comprising:
    selecting a part of the second image content, wherein the ratio between a measure of the selected part and the second image content decreases with time at a predetermined rate as long as the user looking direction is substantially maintained.

21. The method according to claim 20, wherein the ratio between the measure of the selected part and the second image content decreases with time until a predetermined value is reached.

22. The computer program product according to claim 17, additionally comprising:
    analyzing the first image content to determine a direction in which the user is looking by determining at least one of:
        direction of the position of the user's head; and
        direction of the position of the user's eyes.

* * * * *